US012576291B2

(12) United States Patent
Han et al.

(10) Patent No.: US 12,576,291 B2
(45) Date of Patent: Mar. 17, 2026

(54) FILTRATION COMPONENT WITH MICROCAPSULE ELEMENTS FOR RESPIRATORY PROTECTIVE DEVICE

(71) Applicant: HONEYWELL SAFETY PRODUCTS USA, INC., Charlotte, NC (US)

(72) Inventors: Xiaojin Han, Charlotte, NC (US); Hang Tian, Charlotte, NC (US); Enyi Chen, Charlotte, NC (US); Wei Shi, Charlotte, NC (US); Hongbing Xiang, Charlotte, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 642 days.

(21) Appl. No.: 18/060,889

(22) Filed: Dec. 1, 2022

(65) Prior Publication Data

US 2023/0181944 A1      Jun. 15, 2023

(30) Foreign Application Priority Data

Dec. 15, 2021     (CN) .......................... 202111535901.7

(51) Int. Cl.
*A62B 23/02*        (2006.01)
*B01D 46/00*        (2022.01)

(52) U.S. Cl.
CPC .......... *A62B 23/02* (2013.01); *B01D 46/0001* (2013.01); *B01D 46/0038* (2013.01)

(58) Field of Classification Search
CPC .. B01D 46/0038; B01D 46/0001; A62B 23/02
See application file for complete search history.

(56) References Cited

U.S. PATENT DOCUMENTS

| 10,994,521 | B2 | 5/2021 | Hodjat et al. |
| 2005/0227906 | A1 | 10/2005 | Schudel et al. |
| 2010/0227522 | A1 | 9/2010 | Chen et al. |
| 2017/0007861 | A1* | 1/2017 | Parham ................ A62B 18/025 |

FOREIGN PATENT DOCUMENTS

CN          112962320 A      6/2021

* cited by examiner

*Primary Examiner* — Robert Clemente
(74) *Attorney, Agent, or Firm* — Fredrikson & Byron, P.A.

(57)          ABSTRACT

A filtration component with microcapsule elements for respiratory protective devices is provided. In some examples, the filtration component includes a periphery wall element and a filter media element. In some examples, the periphery wall element comprises a plurality of microcapsules. In some examples, the filter media element is secured to an inner circumference surface of the periphery wall element.

20 Claims, 11 Drawing Sheets

FILTRATION COMPONENT WITH MICROCAPSULE ELEMENTS FOR RESPIRATORY PROTECTIVE DEVICE

CROSS-REFERENCE TO RELATED APPLICATIONS

This application claims priority pursuant to 35 U.S.C. 119(a) to Chinese Application No. 202111535901.7, filed Dec. 15, 2021, which application is incorporated herein by reference in its entirety.

FIELD OF THE INVENTION

Example embodiments of the present disclosure relate generally to respiratory protective devices and, more particularly, to a filtration component with microcapsule elements for respiratory protective devices.

BACKGROUND

Applicant has identified many technical challenges and difficulties associated with masks. For example, many masks do not provide a mechanism for controlled scent releasing.

BRIEF SUMMARY

In accordance with various embodiments of the present disclosure, a filtration component for a respiratory protective device is provided.

In some embodiments, the filtration component comprises a periphery wall element and a filter media element. In some embodiments, the periphery wall element comprises a plurality of microcapsules. In some embodiments, the filter media element is secured to an inner circumference surface of the periphery wall element.

In some embodiments, each of the plurality of microcapsules comprises a shell portion and a core portion. In some embodiments, the core portion is positioned within the shell portion.

In some embodiments, the core portion comprises fragrance material, temperature sensitive material, and humidity sensitive material.

In some embodiments, the temperature sensitive material transfers from a solid state to a liquid state when a temperature of the temperature sensitive material is within a temperature range.

In some embodiments, the temperature range is between 32 degrees Celsius and 35 degrees Celsius.

In some embodiments, the temperature sensitive material comprises at least one of paraffin material or polyethylene glycol (PEG) material.

In some embodiments, the humidity sensitive material transfers from a solid state to a liquid state when a relative humidity associated with the humidity sensitive material is in a relative humidity range.

In some embodiments, the relative humidity range is more than 90%.

In some embodiments, the humidity sensitive material comprises at least one of monosaccharide material, disaccharide material, or trisaccharide material.

In some embodiments, the shell portion comprises heat resistant material.

In some embodiments, a melting temperature of the heat resistant material is above 180 degrees Celsius.

In some embodiments, the heat resistant material comprises crosslinked polyurethane, polyamide, and/or functional resin.

In some embodiments, a thickness of the shell portion is above 50 micrometers.

In some embodiments, the periphery wall element further comprises thermoplastic elastomer material.

In accordance with various embodiments of the present disclosure, a method for manufacturing a filtration component for a respiratory protective device is provided. In some embodiments, the method comprises forming a plurality of microcapsules, forming a resin mixture based at least in part on mixing the plurality of microcapsules with thermoplastic elastomer material, forming a mixture strip based at least in part on injecting the resin mixture into an extruder, and forming a periphery wall element of the filtration component based at least in part on molding the mixture strip in a mold. In some embodiments, each of the plurality of microcapsules comprises a shell portion and a core portion.

In some embodiments, when forming the plurality of microcapsules, the method forming comprising: forming the core portion based at least in part on mixing fragrance material, temperature sensitive material, and humidity sensitive material, and coating the core portion with the shell portion. In some embodiments, the shell portion comprises heat resistant material. In some embodiments, the temperature sensitive material comprises at least one of paraffin material or polyethylene glycol (PEG) material. In some embodiments, the humidity sensitive material comprises at least one of monosaccharide material, disaccharide material, or trisaccharide material. In some embodiments, the shell portion comprises crosslinked polyurethane, polyamide, and/or functional resin.

In some embodiments, the method further comprises attaching the filter media element to an inner circumference surface of the periphery wall element.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
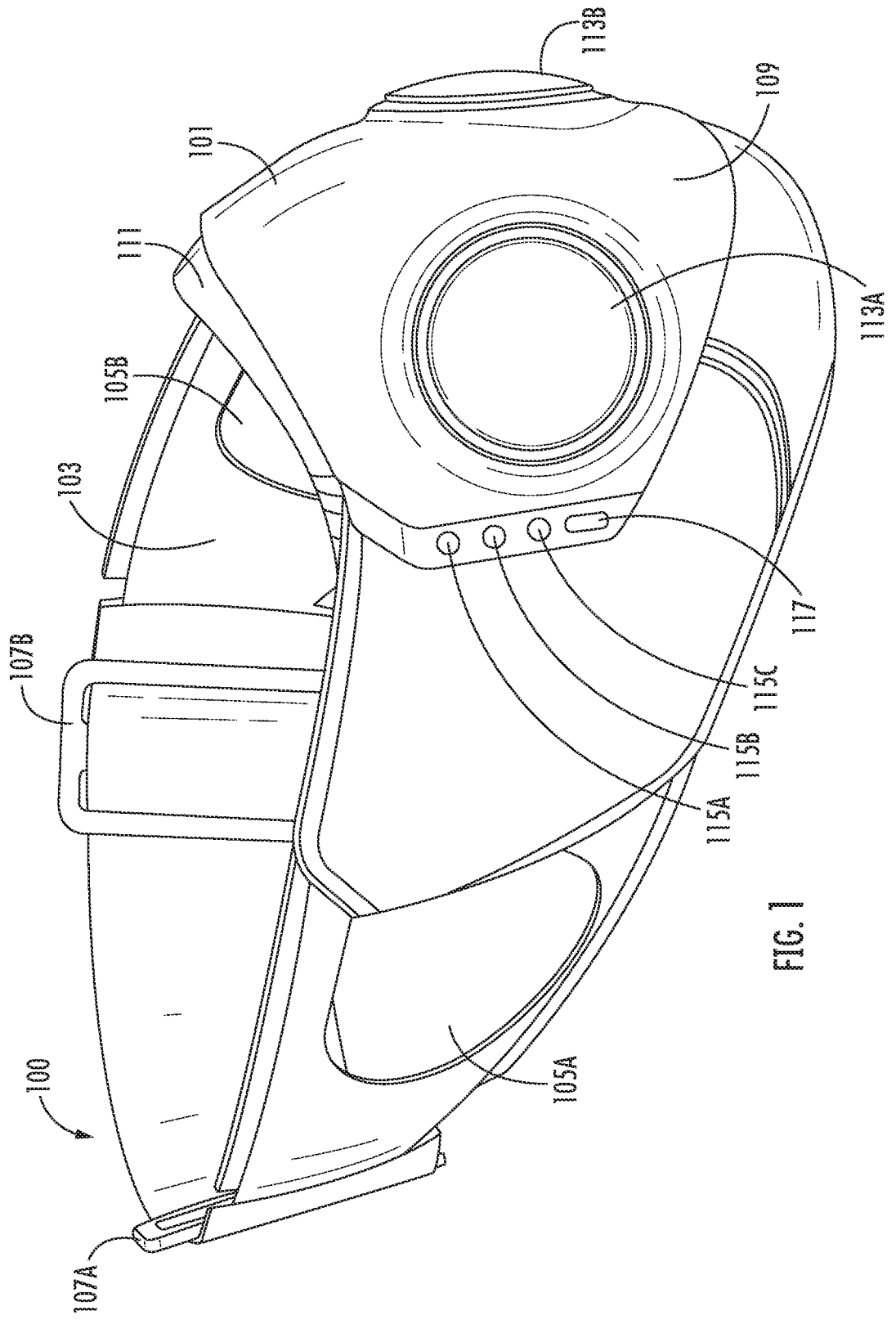
FIG. 1 illustrates an example perspective view of an example respiratory protective device in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Respiratory protective devices (such as, but not limited to, masks, respirators, and/or the like) can protect our health, especially in the COVID-19 pandemic. For example, wearing a respiratory protective device can help slow the spread of the virus, and people are recommended or required to wear face masks in indoor public places and outdoors where there is a high risk of COVID-19 transmission (such as crowded events or large gatherings).

As described above, there are many technical challenges and difficulties associated with respiratory protective devices. For example, there are needs from customers to have a mask with filters that provide fragrance scents for better user experience. For example, filters within the mask may be designed to be used for several weeks, which would generate bad smells.

In addition, users may need different fragrance scents to provide different functions so as to improve user experience. For example, cypress, mint, lemon, jasmine, and lavender may provide a refreshing scent. Eucalyptus, lemon, and lavender may strengthen immunity. Lavender and sandalwood may provide mood stabilization. Sandalwood, grapefruit, tea, eucalyptus, lavender, and lemon may provide a clean air smell. Lemon, jasmine, and lavender may provide beauty benefits.

Further, performance requirements for such filters may include, but are not limited to, high technical and process feasibility, no impact to filter performance, no impact on current manufacturing process, long lasting time release, and controllable release.

However, many masks fail to overcome the above-referenced technical challenges and difficulties, and fail to satisfy the performance requirements. For example, some solutions may directly spray dispersing element on the filter media, and the scents from the dispersing element are not long lasting and can impact the performance of the filter media and shorten its service time. Some solutions may provide brittle capsules, which increases the risk of breathing in the capsules and also requires a user to manually break the brittle capsules, causing safety and leakage concerns.

In contrast, various embodiments of the present disclosure overcome the above-referenced technical challenges and difficulties, and satisfy the performance requirements.

For example, example embodiments of the present disclosure provide a smart scent releasing mechanism that provides built-in microencapsulated scent ingredients with thermoplastic elastomer (TPE) for the filter ring (also referred to as the periphery wall element). In some embodiments, TPE modifications with blending technology of scent ingredients in the filter ring does not impact the filter performance. In some embodiments, microencapsulated scent ingredients provide long-lasting releasing effects. In some embodiments, material and structure of microencapsulation design allow for high temperature TPE blending and extruding processing, while providing smart scent releasing based on respiration characteristics associated with the users of the mask.

As such, various embodiments of the present disclosure provide a controllable fragrance system based on adding microcapsules to thermal plastic elastic (TPE) ring. The TPE extruding temperature (about 160~200 degrees Celsius) is much higher than normal microencapsulated shell material melting temperature (below 60 degrees Celsius), and therefore it is infeasible for normal microcapsules to be added. To overcome such challenges, various embodiments of the present disclosure provide a high temperature resistant shell material for the microcapsules.

Additionally, many example embodiments of the present disclosure provide a controllable fragrance release mechanism. For example, temperature and humidity sensitive chemicals are added in microcapsules. In some embodiments, when the temperature is between 32 and 35 degrees Celsius (which corresponds to a normal temperature range in a mask when a user is breathing) and humidity is 90~95% (which corresponds to a normal humidity range in the mask when the user is breathing), these chemicals will dissolve fragrance particles and fragrance can be released from the high temperature resistance shell. In contrast, many solutions only provide a multilayer shell structure with only fragrance-releasing particles that are not sensitive to temperature or humidity.

Referring now to FIG. 1, an example perspective view of an example respiratory protective device (also referred to as a respiratory protective equipment) 100 in accordance with some example embodiments described herein is illustrated.

In some embodiments, the example respiratory protective device 100 is in the form of a respirator or a mask. For example, as shown in FIG. 1, the example respiratory protective device 100 comprises a mask component 101 and a strap component 103.

In some embodiments, the strap component 103 may be in the form of a mask strap. For example, in some embodiments, the strap component 103 may comprise elastic material(s) such as, but not limited to, polymers, thermoplastic elastomer (TPE), and/or the like. In some embodiments, the elastic material may allow the example respiratory protective device 100 to be secured to a user's face.

In some embodiments, the strap component 103 may comprise an ear opening 105A and an ear opening 105B. When the example respiratory protective device 100 is worn by a user, the ear opening 105A and the ear opening 105B may allow the user's left ear and the right ear to pass through.

In some embodiments, the strap component 103 may be inserted through one or more strap bucket components (such as a strap bucket component 107A and a strap bucket component 107B as shown in FIG. 1). In some embodiments, the one or more strap bucket components may be in the form of one or more buckles that include, but not limited to, a tri-glide buckle), and may allow a user to adjust the length of the strap component 103 so that the example respiratory protective device 100 can be secured to a user's face.

In some embodiments, the mask component 101 is connected to the strap component 103. For example, a first end of the strap component 103 is connected to a first end of the mask component 101, and a second end of the strap component 103 is connected to a second of the mask component 101. In this example, the first end of the mask component 101 is opposite to the second end of the mask component 101. In the example shown in FIG. 1, an end of the strap component 103 may be secured to the mask component 101 via a fastener component 117 (such as, but not limited to, a snap button).

In some embodiments, the mask component 101 may be in the form of a mask or a respirator. For example, as shown in FIG. 1, the mask component 101 may comprise an outer shell component 109 and a face seal component 111.

In some embodiments, when the example respiratory protective device 100 is worn by a user, an outer surface of the outer shell component 109 is exposed to the outside environment. In some embodiments, the face seal component 111 is attached to and extends from a periphery and/or edge of the outer shell component 109 (or an inner shell component of the mask component as described herein).

In particular, the face seal component 111 may comprise soft material such as, but not limited to, silica gel. In some embodiments, when the example respiratory protective device 100 is worn by a user, the face seal component 111 is in contact with the user's face, and may seal the example respiratory protective device 100 to at least a portion of a user's face. As described above, the example respiratory protective device 100 includes strap component 103 that allows the example respiratory protective device 100 to be secured to the user's face. As such, the face seal component 111 can create at least partially enclosed (or entirely enclosed) space between at least a portion of the user's face (e.g. mouth, nostrils, etc.), details of which are described herein.

In some embodiments, the mask component 101 comprises one or more puck components that cover one or more inhalation filtration components of the example respiratory protective device 100. For example, as shown in FIG. 1, the example respiratory protective device 100 comprises a first puck component 113A that is disposed on a left side of the outer shell component 109 and a second puck component 113B that is disposed on a right side of the outer shell component 109. In such an example, the first puck component 113A covers a first inhalation filtration component that is disposed on the left side of the mask component 101, and the second puck component 113B covers a second inhalation filtration component that is disposed on the right side of the mask component 101, details of which are described herein.

In some embodiments, the mask component 101 comprises one or more key components (such as, but not limited to, the key component 115A, the key component 115B, and the key component 115C) that may allow a user to manually control the operations of the fan component of the mask component 101 and/or other devices (such as, but not limited to, earphones) that are in electronic communication with the example respiratory protective device 100.

Figure 2A:
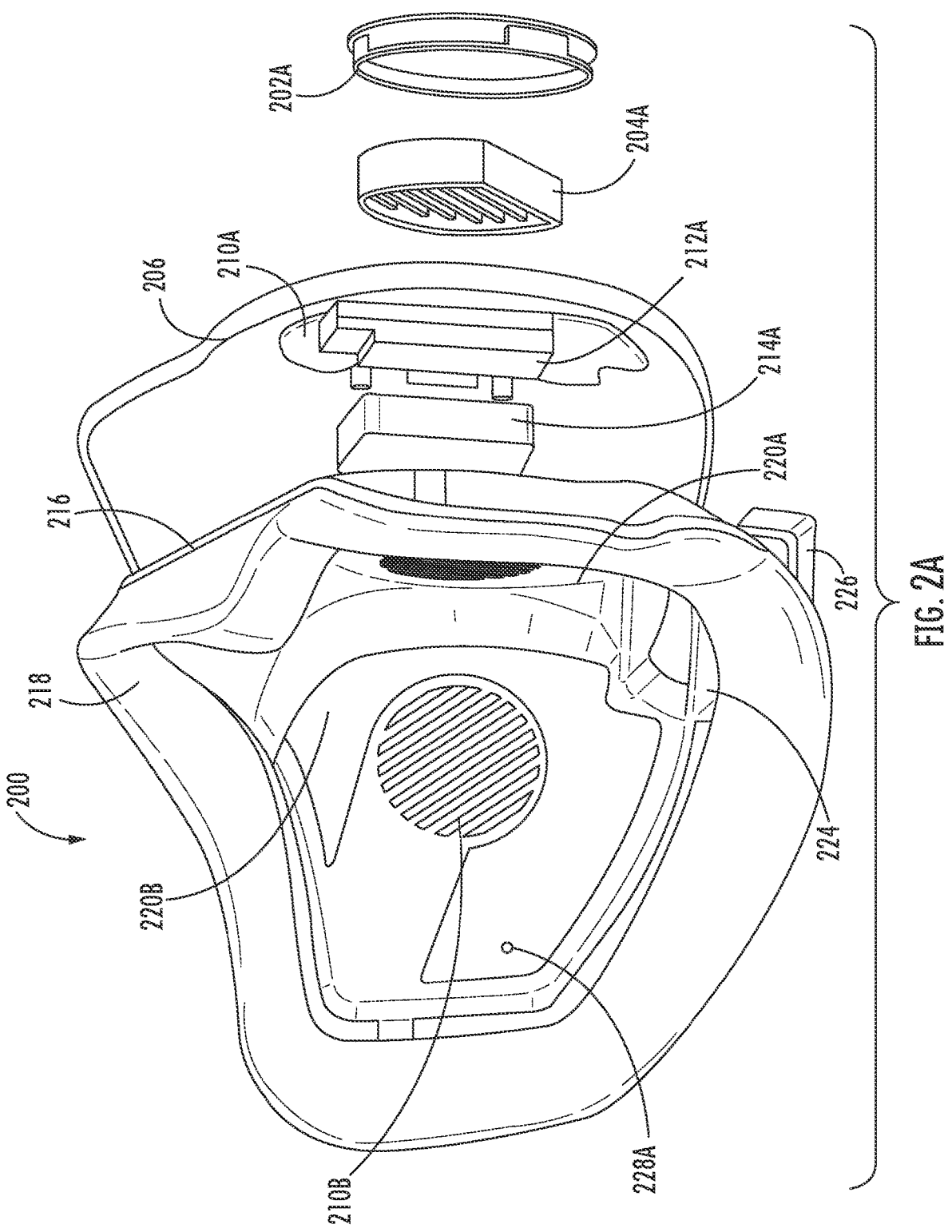
FIG. 2A illustrates an example exploded view of an example mask component in accordance with some example embodiments described herein.
Figure 2B:
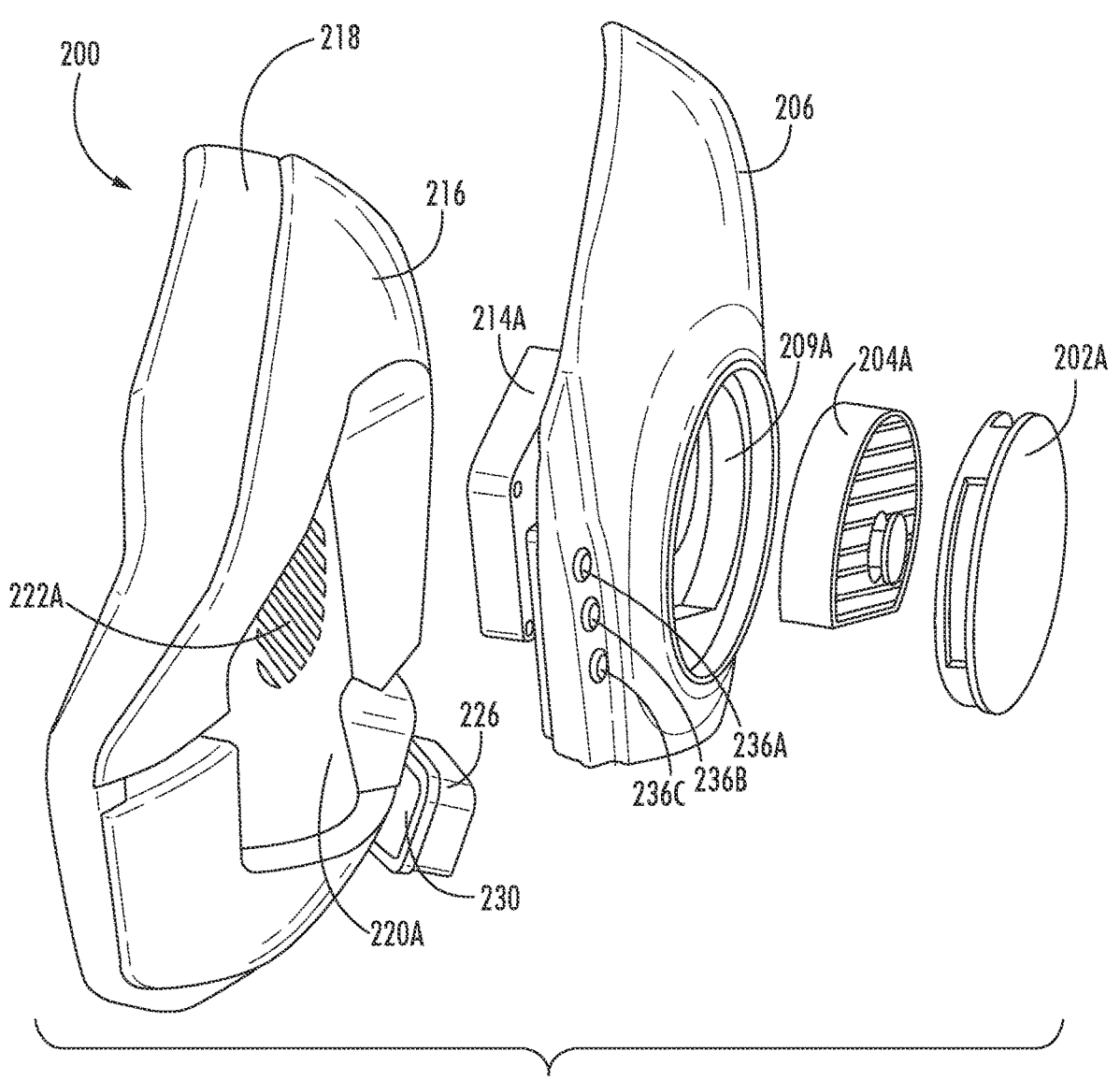
FIG. 2B illustrates another example exploded view of an example mask component in accordance with some example embodiments described herein.
Figure 2C:
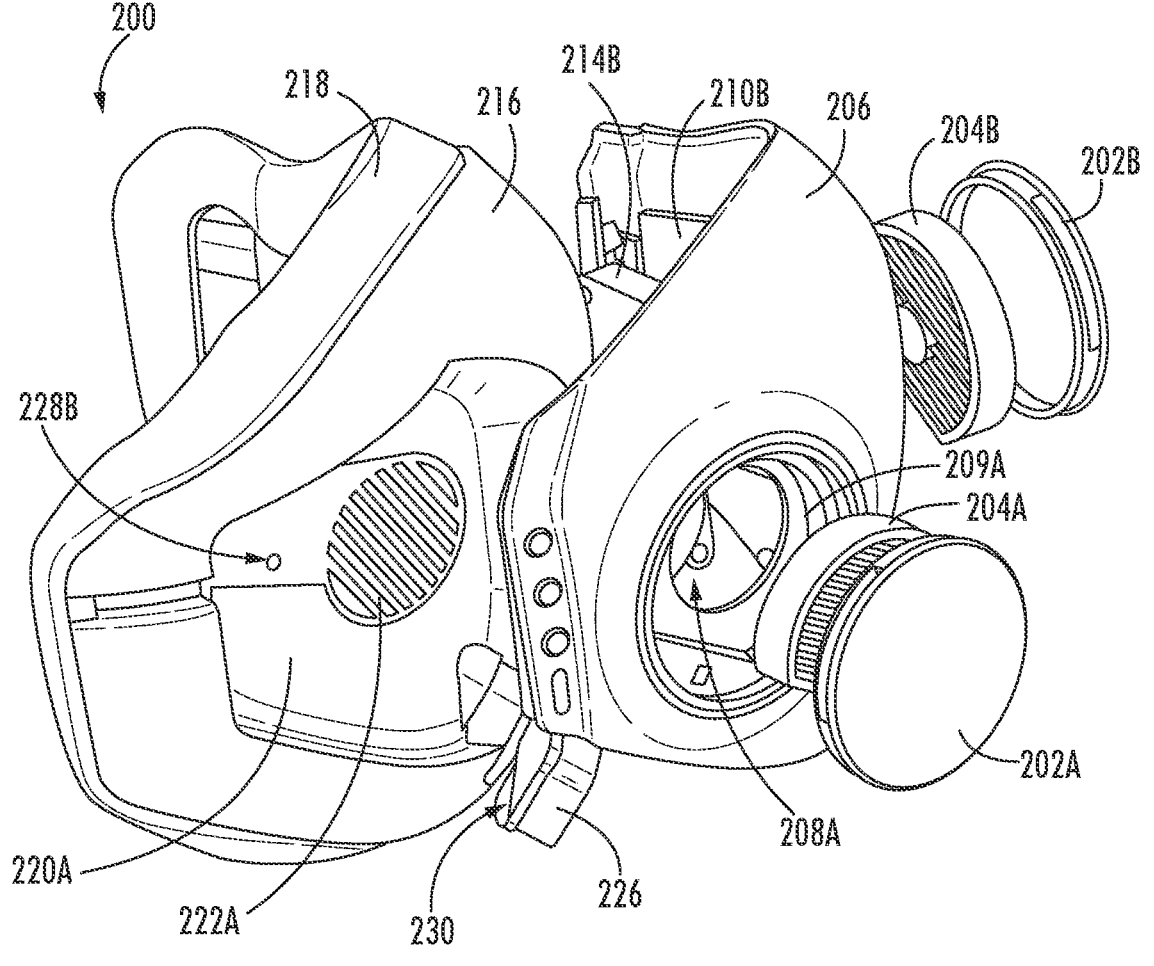
FIG. 2C illustrates another example exploded view of an example mask component in accordance with some example embodiments described herein.
Figure 2D:
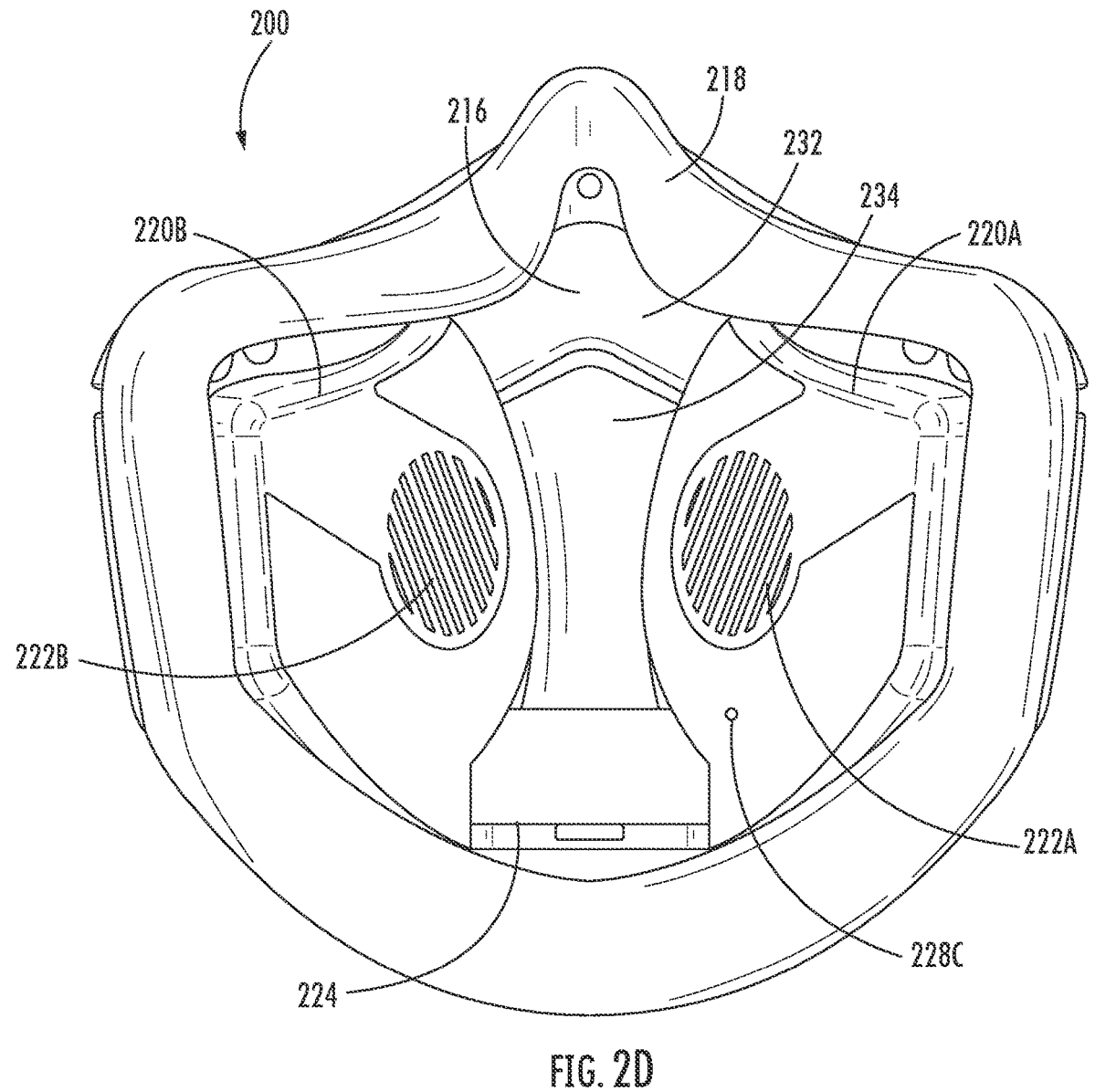
FIG. 2D illustrates an example back view of an example mask component in accordance with some example embodiments described herein.

Referring now to FIG. 2A, FIG. 2B, FIG. 2C, and FIG. 2D, examples views of an example mask component 200 in accordance with some example embodiments described herein are illustrated. In particular, FIG. 2A to FIG. 2C illustrate example exploded views of the example mask component 200, and FIG. 2D illustrates an example back view of the example mask component 200.

As shown in FIG. 2A, the mask component 200 comprises an outer shell component 206 and an inner shell component 216.

In some embodiments, the inner shell component 216 may be in a shape that is based on the contour of the user's face. In particular, when the mask component 200 is worn by a user, at least a portion of the user's face (such as, but not limited to, mouth, nostrils) are housed within the inner shell component 216.

In some embodiments, the mask component 200 may comprise a face seal component 218. In some embodiments, the face seal component 218 is attached to and extends from a periphery and/or edge of the inner shell component 216. Similar to the face seal component 111 described above in connection with FIG. 1, the face seal component 216 may comprise soft material such as, but not limited to, silica gel.

In some embodiments, when the mask component 200 is worn by a user, the face seal component 218 and an inner surface of the inner shell component 216 create an enclosed space on at least a portion of the user's face (e.g. on the mouth, nostrils, etc.).

Similar to the inner shell component 216 described above, the shape of the outer shell component 206 may be based on a contour of the user's face. In some embodiments, when the mask component 200 is assembled, the inner surface of the outer shell component 206 is secured to an outer surface of the inner shell component 216. In some embodiments, the inner shell component 216 may comprise one or more indentation portions on the outer surface of inner shell component 216.

For example, referring now to FIG. 2B, the inner shell component 216 may comprise inner shell indentation portions such as, but not limited to, an inner shell indentation portion 220A that is on a left side of the mask component 200 and an inner shell indentation portion 220B that is on a right side of the mask component 200. In particular, each of the inner shell indentation portion 220A and inner shell indentation portion 220B may be sunken or depressed from the outer surface of inner shell component 216. As such, when the outer shell component 206 is secured to the inner shell component 216, the indentation portions may create space that houses electronic components.

Referring back to FIG. 2A, in some embodiments, one or more circuit board components (such as, but not limited to, a circuit board component 210A), one or more charging circuit components (such as, but not limited to, a charging circuit component 212A), and one or more fan components (such as, but not limited to, a fan component 214A) may be disposed in the space that is defined by the inner shell indentation portion 220A and the inner surface of the outer shell component 206. Similarly, one or more circuit board components (such as, but not limited to, a circuit board component 210B), one or more charging circuit components, and one or more fan components (such as, but not limited to, a fan component 214B) may be disposed in the space that is defined by the inner shell indentation portion 220B and the inner surface of the outer shell component 206. For example, the fan component 214A may be disposed on the right side of the example respiratory protective device 200 and the fan component 214B may be disposed on the left side of the example respiratory protective device 200.

In some embodiments, the circuit board component 210A comprises a circuit board (such as, but not limited to a printed circuit board (PCB)) where other electronic components can be secured to and be in electronic communications with one another. For example, a controller component, the charging circuit component 212A and the fan component 214A may be secured to the circuit board component 210A and be in electronic communication with one another.

In some embodiments, the charging circuit component 212A may comprise a charging circuit and/or a battery that supplies power to the controller component and/or the fan component 214A. For example, the charging circuit may include a Universal Serial Bus (USB) charger circuit that is connected to a rechargeable battery.

In some embodiments, the fan component 214A may comprise an electric fan. In some embodiments, the electric fan of the fan component 214A may operate at different rotation speeds. For example, the fan component 214A may be a stepped fan that provides different, predetermined settings for the rotation speeds. Additionally, or alternatively, the fan component 214A may be a stepless fan that enables continuous adjustment of the rotation speed.

In some embodiments, the electric fan of the fan component 214A may operate at different rotational directions. For example, the fan component 214A may operate in a forward direction or a reverse direction. As an example, when the fan component 214A operates in the forward rotational direction, the electric fan of the fan component 214A may rotate counter-clockwise (when viewing from a user wearing the mask component 200) and/or may operate as a blower that draws air from outside the mask component 200 to inside the mask component 200. As another example, when the fan component 214A operates in the reverse rotational direction, the electric fan of the fan component 214A may rotate clockwise (when viewing from a user wearing the mask component 200) and/or may operate as an exhaust/ventilation fan that draws air from inside the mask component 200 to outside the mask component 200.

In some embodiments, the start time, the stop time, the rotational directions (e.g. forward direction or reverse direction) and/or the rotation speed of the electric fan of the fan component 214A may be controlled and/or adjusted by the controller component.

For example, the controller component may transmit a forward rotation start signal to the fan component 214A that causes the fan component 214A to start forward rotation (e.g. start operating as a blower that draws air from outside the mask component 200 towards inside the mask component 200). In some embodiments, the forward rotation start signal may include a forward rotation speed value that indicates the speed for the fan component 214A. Additionally, or alternatively, the controller component may transmit a forward rotation stop signal to the fan component 214A that causes the fan component 214A to stop forward rotation.

Additionally, or alternatively, the controller component may transmit a reverse rotation start signal to the fan component 214A that causes the fan component 214A to start reverse rotation (e.g. start operating as an exhaust fan that draws air from inside the mask component 200 towards outside the mask component 200). In some embodiments, the reverse rotation start signal may include a reverse rotation speed value that indicates the speed for the fan component 214A. Additionally, or alternatively, the controller component may transmit a reverse rotation stop signal to the fan component 214A that causes the fan component 214A to stop reverse rotation.

Referring now to FIG. 2C, the mask component 200 may comprise one or more inhalation filtration components (such as, but not limited to, inhalation filtration component 204A and inhalation filtration component 204B) and one or more puck components (such as, but not limited to puck component 202A and puck component 202B).

In some embodiments, each of the one or more inhalation filtration components may comprise a filter media element that comprise filter material for filtering air. Examples of filter material include, but are not limited to, HEPA filters. In some embodiments, each of the one or more puck components may be positioned to cover one of the inhalation filtration components so as to prolong the lifespan of the mask component 200. For example, the puck component 202A may cover the inhalation filtration component 204A, and the puck component 202B may cover the inhalation filtration component 204B.

As shown in FIG. 2C, the outer shell component 206 of the example mask component 200 may comprise one or more outer shell indentation portions (such as the outer shell indentation portion 209A). In particular, each of the outer shell indentation portion 209A may be sunken or depressed from the outer surface of outer shell component 206. In some embodiments, one or more inhalation filtration components may be disposed in the outer shell indentation portions. For example, as shown in FIG. 2C, an inhalation filtration component 204A is disposed in the outer shell indentation portion 209A.

In some embodiments, each of the one or more outer shell indentation portions may comprise an air inlet opening, and each of the one or more inner shell indentation portions may comprise one or more air inlet slots. In some embodiments, when the mask component 200 is assembled and in use, the air inlet opening on the outer shell indentation portion is aligned with the one or more air inlet slots on the inner shell indentation portion.

For example, as shown in FIG. 2C, the air inlet opening 208A on the outer shell indentation portion 209A of the outer shell component 206 is aligned with the air inlet slots 222A on the inner shell indentation portion 220A of the inner shell component 216.

In this example, when the mask component 200 is worn by a user and the user inhales, air is drawn from the outside environment and travels through the inhalation filtration component 204A, through the air inlet opening 208A, through the air inlet slots 222A, and arrive at the user's mouth or nostrils. As described above and shown in FIG. 2A and FIG. 2B, the fan component 214A is disposed on the inner shell indentation portion 220A (where the air inlet slots 222A are located). In some embodiments, when the user inhales, the fan component 214A may operate in a forward direction that draws air from outside the mask component 200 towards inside the mask component 200, thereby facilitating the inhaling of the user.

Referring now to FIG. 2D, an example back view of the example mask component 200. In particular, FIG. 2D illustrates the view of the example mask component 200 when it is worn by a user and viewed by the user.

As shown in FIG. 2D, the example mask component 200 may comprise air inlet slots 222A that are located on the middle right side of the inner shell component 216, and air inlet slots 222B that are located on the middle left side of the inner shell component 216. For example, the inner surface 232 of the inner shell component 216 may comprise a nose portion 234, where a user may put his or her nose when the mask component 200 is worn. In this example, the air inlet slots 222A may be located to the right of the nose portion 234, and the air inlet slots 222B may be located to the left of the nose portion 234.

In some embodiments, the example mask component 200 may comprise an outlet opening 224 that is on a middle bottom portion of the inner shell component 216. In some embodiments, the outlet opening 224 may be located corresponding to the position of the user's mouth. For example, when a user exhales, the breath may be released through the outlet opening 224.

As shown in FIG. 2A to FIG. 2C, an exhalation filtration component 226 may be connected to the inner shell component 216 at the outlet opening 224. For example, the exhalation filtration component 226 may cover the outlet opening 224. In some embodiments, the exhalation filtration component 226 may comprise a filter media element that comprise filter material for filtering air. Examples of filter material include, but are not limited to, HEPA filters. As such, the breath that is exhaled by the user may be filtered before it is released from inside the mask component 200 to the outside environment.

In some embodiments, the exhalation filtration component 226 may comprise an air quality sensor component 230 that at least partially covers the outlet opening 224 of the inner shell component 216. The air quality sensor component 230 may comprise an air quality sensor that may, for example but not limited to, detect particulate matters in the outer environment, in the enclosed space and/or in the breath exhaled by the user. Examples of the air quality sensor component 230 include, but are not limited to, metal oxide sensors, electrochemical sensors, photo ionization detectors, optical particle counters, optical sensors, and/or the like. In some embodiments, the air quality sensor component 230 is in electronic communication with the controller component, and may transmit air quality indications to the controller component indicating the detected air quality.

In some embodiments, the mask component 200 may comprise one or more pressure sensor components. As described above and as shown in FIG. 2B, when the mask component 200 is worn by a user, the face seal component 218 and an inner surface 232 of the inner shell component 216 create an enclosed space on at least a portion of the user's face (e.g. on the mouth, nostrils, etc.). In some embodiments, a pressure sensor component may comprise a pressure sensor that detects the air pressure within this enclosed space. Examples of the pressure sensor components include, but are not limited to, resistive air pressure transducer or strain gauge, capacitive air pressure transducer, inductive air pressure transducer, and/or the like.

For example, as shown in FIG. 2A, a pressure sensor component 228A may be disposed on an inner surface of the inner shell component 216. Additionally, or alternatively, as shown in FIG. 2C, a pressure sensor component 228B may be disposed on the inner shell indentation portion 220A of the inner shell component 216. Additionally, or alternatively, as shown in FIG. 2D, a pressure sensor component 228C may be disposed on the inner surface of the inner shell component 216. The pressure sensor component 228A, the pressure sensor component 228B, and/or the pressure sensor component 228C may detect the air pressure within the enclosed space defined by the face seal component 218 and the inner shell component 216 on at least a portion of the user's face.

In some embodiments, the one or more pressure sensor components are in electronic communication with the controller component, and may transmit air pressure indications to the controller component indicating the detected air pressure. For example, each of the air pressure indications may comprise an air pressure value that corresponds to the air pressure in the enclosed space as defined by the face seal component 218 and the inner shell component 216.

While the description above provides an example mask component, it is noted that the scope of the present disclosure is not limited to the description above. In some examples, an example mask component may comprise one or more additional and/or alternative elements. For example, an example mask component may comprise less than two or more than two fan components. Additionally, or alternatively, an example mask component may comprise less than two or more than two inhalation filtration components.

In some embodiments, mask component 200 may include one or more key components, such as, but not limited to, a key component 236A, a key component 236B, and a key component 236C. In some embodiments, the one or more key components may be disposed on an outer surface of the outer shell component 206. Each of the one or more key components may provide a button that allow a user to control and/or adjust the operations of various electronic components described herein (such as, but not limited to, fan components, earphones, and/or the like.)

Figure 3:
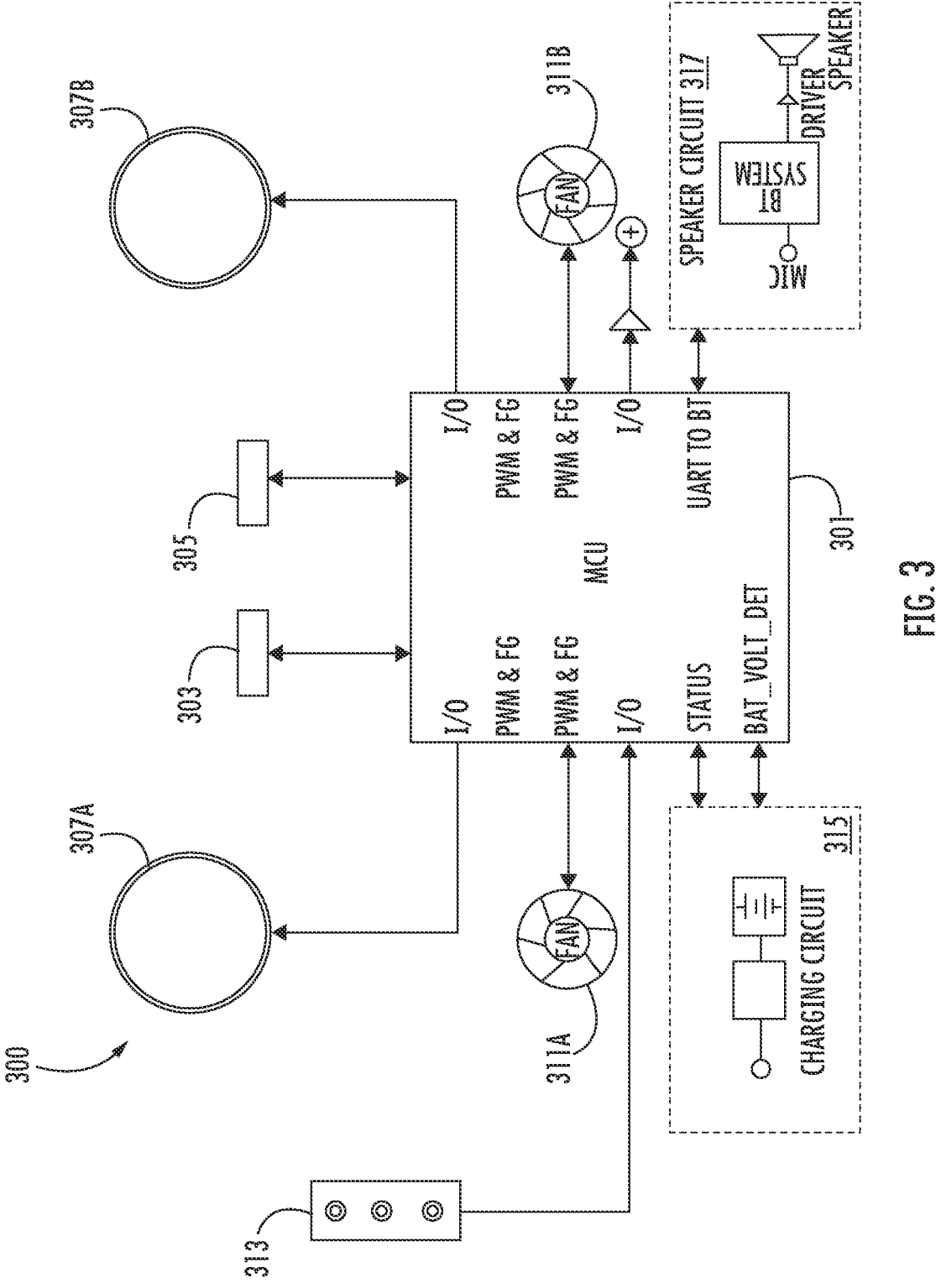
FIG. 3 illustrates an example circuit diagram of an example respiratory protective device in accordance with some example embodiments described herein.

Referring now to FIG. 3, an example circuit diagram of an example respiratory protective device 300 in accordance with some example embodiments described herein is illustrated. In particular, FIG. 3 illustrates example electronic components of an example respiratory protective device in accordance with various example embodiments of the present disclosure.

As shown in FIG. 3, the example respiratory protective device 300 may comprise a controller component 301 that is in electronic communications with other components such as, but not limited to, the pressure sensor component 303, the air quality sensor component 305, a light 307A and a light 307B that are disposed on one or more puck components, fan component 311A, fan component 311B, key components 313, and/or the speaker circuit 317.

In some embodiments, the controller component 301 may be embodied as means including one or more microprocessors with accompanying digital signal processor(s), one or more processor(s) without an accompanying digital signal processor, one or more coprocessors, one or more multicore processors, one or more controllers, processors, one or more computers, various other processing elements including integrated circuits such as, for example, an application specific integrated circuit (ASIC), programmable logic controller (PLC) or field programmable gate array (FPGA), or some combination thereof. Accordingly, although illustrated in FIG. 3 as a single processor, in an embodiment, the controller component 301 may include a plurality of processors and signal processing modules. The plurality of processors may be in operative communication with each other and may be collectively configured to perform one or more functionalities as described herein. In an example embodiment, the controller component 301 may be configured to execute instructions stored in a memory circuitry or otherwise accessible to the controller component.

Whether configured by hardware, firmware/software methods, or by a combination thereof, the controller component 301 may include an entity capable of performing operations according to embodiments of the present disclosure while configured accordingly. Thus, for example, when the controller component 301 is embodied as an ASIC, PLC, FPGA or the like, the controller component 301 may include specifically configured hardware for conducting one or more operations described herein. Alternatively, as another example, when the controller component 301 is embodied as an executor of instructions, such as may be stored in the memory circuitry, the instructions may specifically configure the controller component 301 to perform one or more algorithms and operations described herein.

Thus, the controller component 301 used herein may refer to a programmable microprocessor, microcomputer or multiple processor chip or chips that can be configured by software instructions (applications) to perform a variety of functions, including the functions of the various embodiments described above.

In some embodiments, the memory circuitry may include suitable logic, circuitry, and/or interfaces that are adapted to store a set of instructions that is executable by the controller component 301 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory circuitry may be integrated with the controller component 301 on a single chip, without departing from the scope of the disclosure.

In some embodiments, the pressure sensor component 303 may transmit air pressure indications to the controller component 301. As described above, each of the air pressure indications may comprise an air pressure value that corresponds to the air pressure in the enclosed space as defined by the face seal component 218 and the inner shell component 216.

In some embodiments, the air quality sensor component 305 may transmit air quality indications to the controller component 301. As described above, the air quality indications may indicate a quality of the air in the outer environment, in the enclosed space and/or in the breath exhaled by the user.

In some embodiments, the controller component 301 may transmit control signals to the light 307A and/or the light 307B so as to adjust the color and/or intensity of the light emitted by the light 307A and/or the light 307B.

In some embodiments, the controller component 301 may transmit forward rotation start signals to the fan component 311A and/or the fan component 311B to cause the fan component 311A and/or the fan component 311B to start forward rotation. In some embodiments, the controller component 301 may transmit forward rotation stop signals to the fan component 311A and/or the fan component 311B to cause the fan component 311A and/or the fan component 311B to stop forward rotation.

In some embodiments, the controller component 301 may transmit reverse rotation start signals to the fan component 311A and/or the fan component 311B to cause the fan component 311A and/or the fan component 311B to start reverse rotation. In some embodiments, the controller component 301 may transmit reverse rotation stop signals to the fan component 311A and/or the fan component 311B to cause the fan component 311A and/or the fan component 311B to stop reverse rotation.

In some embodiments, the controller component 301 is in electronic communication with the key components 313. For example, when a user presses a button on the key components 313, the key components 313 may transmit a signal to the controller component 301.

In some embodiments, the controller component 301 is in electronic communication with the speaker circuit 317. For example, the controller component 301 may transmit control signals to an earphone in the speaker circuit 317 so as to adjust volume, noise canceling mode, and/or the like of the earphone.

In some embodiments, the charging circuit 315 supplies power to controller component 301 and one or more other electronic components shown in FIG. 3 (such as, but not limited to, the fan component 311A and the fan component 311B).

Figure 4:
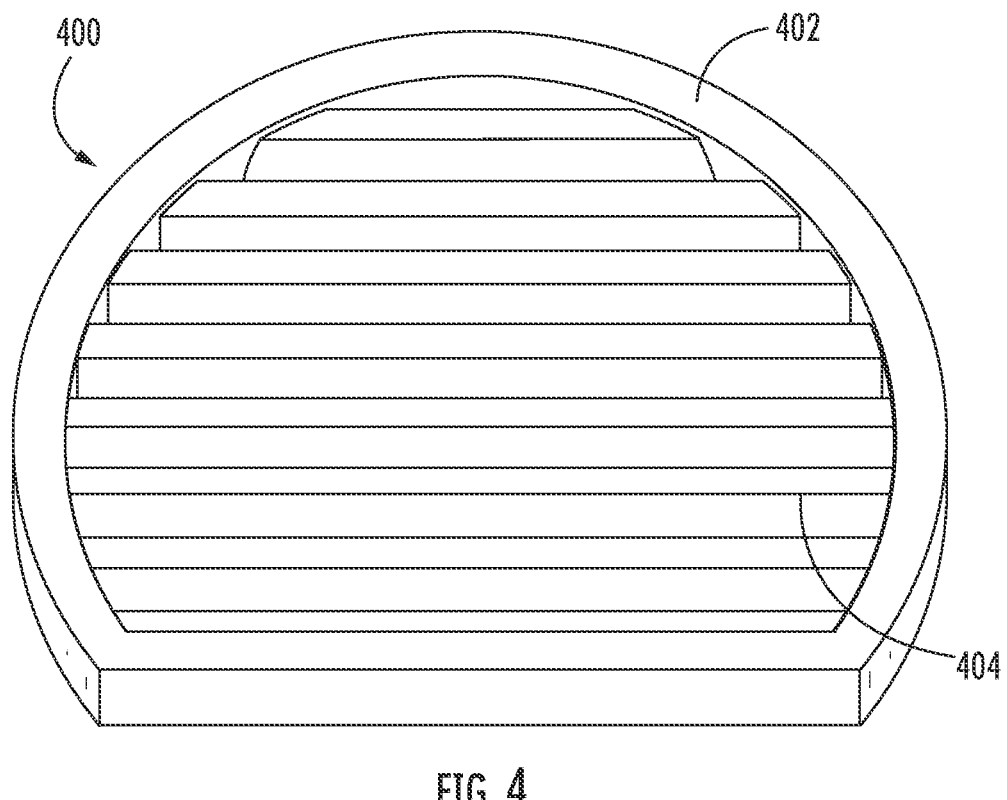
FIG. 4 illustrates an example filtration component for an example respiratory protective device in accordance with some example embodiments described herein.

As described above, an example respiratory protective device may comprise one or more inhalation filtration components and/or one or more exhalation filtration components. Referring now to FIG. 4, an example filtration component 400 for a respiratory protective device is illustrated. In some embodiments, the example filtration component 400 is an example inhalation filtration component. In some embodiments, the example filtration component 400 is an example exhalation filtration component In the example shown in FIG. 4, the example filtration component 400 comprises a periphery wall element 402 and a filter media element 404.

In some embodiments, the periphery wall element 402 may be in a shape similar to an annular cylinder shape. In some embodiments, the periphery wall element 402 may be molded into a shape similar to a three dimensional letter "D" shape. For example, the periphery wall element 402 may comprise an arc portion and a straight portion that is connected to the arc portion.

In some embodiments, the filter media element 404 is secured to the periphery wall element 402. For example, the periphery wall element 402 may comprise an inner circumference surface that corresponds to an inner lateral surface of the annular cylinder shape, and the filter media element 404 may be secured to the inner circumference surface of the periphery wall element 402. For example, a periphery edge of the filter media element 404 is attached to the inner circumference surface of the periphery wall element 402.

In some embodiments, the filter media element 404 may comprise filter material such as, but not limited to, HEPA filter materials. In the example shown in FIG. 4, the filter media element 404 may be pleated and/or folded into a zig-zag shape that increases the surface area of the HEPA filter materials and allows a large area of HEPA filter materials to be used.

In some embodiments, the periphery wall element 402 may comprise material that is easy to use during the manufacturing process. For example, in some embodiments, the periphery wall element 402 comprises materials such as, but not limited to, thermoplastic elastomer (TPE) material.

In some embodiments, TPE materials (such as, but not limited to, styrene-butadiene-styrene (SBS) TPE and/or styrene-ethylene-butylene-styrene (SEBS) TPE) requires a high processing temperature. For example, many TPE materials may form the shapes needed for the example filtration component 400 through an injection molding process. During the injection molding process, TPE materials are fed into a heated barrel. The heat from the barrel turns the TPE materials into a liquid resin, which is then injected into a closed mold under high pressure. In order to turn the TPE materials into a liquid form, the heated barrel may be at a temperature between 160 degrees Celsius and 220 degrees Celsius.

As described above, many users may require fragrance materials to be added to the filtration component so as to improve the user experience. However, many fragrance materials have a boiling temperature of less than 60 degrees Celsius. If fragrance materials are mixed with TPE materials, and the mixture is molded to manufacture the periphery wall element 402, the high processing temperature that is required for the TPE materials may cause the fragrance materials to be volatilized.

Figure 5:
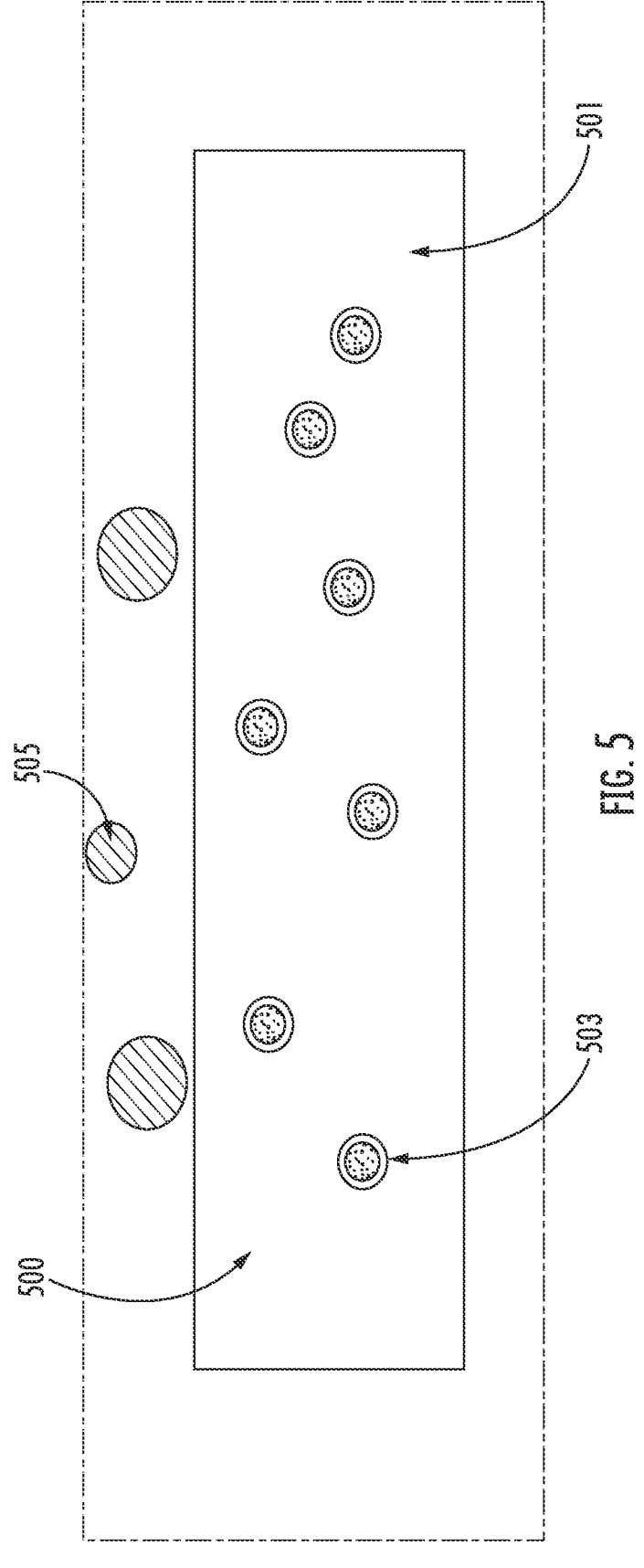
FIG. 5 illustrates an example diagram illustrating example materials associated with an example periphery wall element in accordance with some example embodiments described herein.

To overcome the above technical challenges and difficulties, the periphery wall element 402 in accordance with various embodiments of the present disclosure may comprise a plurality of microcapsules. Referring now to FIG. 5, an example diagram illustrating example materials associated with an example periphery wall element 500 in accordance with some example embodiments is provided.

In the example shown in FIG. 5, the example periphery wall element 500 comprises TPE materials 501 and a plurality of microcapsules 503. In some embodiments, each of the plurality of microcapsules 503 may comprise fragrance materials 505 that are within a shell portion. When the example respiratory protective device is in use, the fragrance materials 505 may be slowly released through the shell portion of the plurality of microcapsules 503 and from the example periphery wall element 500, and may be received by a user.

Figure 6:
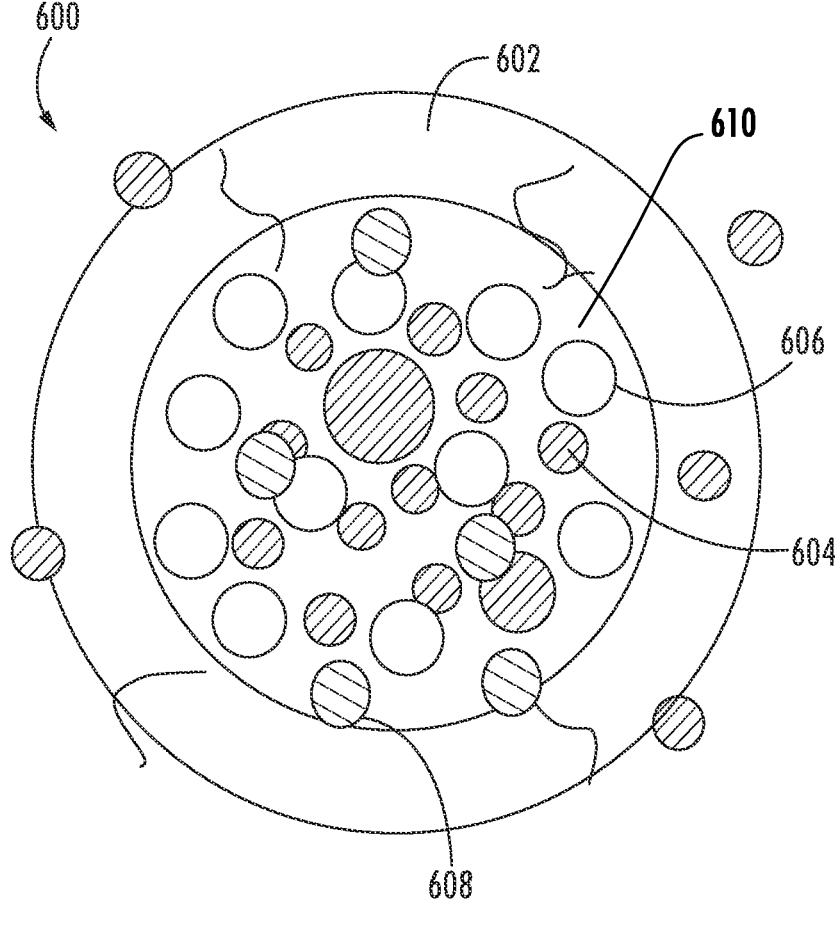
FIG. 6 illustrates an example diagram illustrating an example microcapsule in accordance with some example embodiments described herein.

Referring now to FIG. 6, an example diagram illustrating an example microcapsule 600 in accordance with some example embodiments of the present disclosure is provided.

As described above, an example periphery wall element of an example filtration component in accordance with various examples of the present disclosure may comprise a plurality of microcapsules. In FIG. 6, each of the plurality of microcapsules comprises a shell portion 602 and a core portion 610.

In some embodiments, the core portion 610 is positioned within the shell portion 602. For example, the shell portion 602 may encapsulate the core portion 610. In some embodiments, the shell portion 602 may be coated on the core portion 610.

In some embodiments, the shell portion 602 may protect materials within the core portion 610 from outside environment (such as the high processing temperature that is required for processing the TPE materials as described above). In some embodiments, the shell portion 602 comprises heat resistant materials. While some microcapsules may implement materials with a melting temperature that is less than 100 degrees Celsius, such microcapsules cannot protect the materials within the core portion 610 during TPE material processing. In accordance with various examples of the present disclosure, a melting temperature of the heat resistant material for the shell portion 602 is above 180 degrees Celsius so as to protect the materials in the core portion 610 from the high processing temperature for the TPE material. In some embodiments, the heat resistant materials for the shell portion 602 may include, but are not limited to, crosslinked polyurethane, polyamide, and/or functional resin.

Additionally, or alternatively, while some microcapsules may have a shell portion that has a thickness between 0.01 micrometers and 10 micrometers, the manufacturing process for the periphery wall element may cause the shell portion to be broken away and separated from the core portion (for example, due to high temperature, wear and tear, etc.). In accordance with various examples of the present disclosure, the shell portion 602 may have a thickness that is above 50 micrometers. In such examples, the shell portion 602 can take part of the material loss during the manufacturing process, and the example microcapsule 600 can be more durable through the high temperature environment and the wear and tear during the manufacturing process.

In the example shown in FIG. 6, the core portion 610 comprises materials such as, but not limited to, fragrance material 604, temperature sensitive material 606, and humidity sensitive material 608.

In some embodiments, the fragrance material 604 may include one or more scented materials. For example, the fragrance material 604 may comprise fragrance oil, essential oils, and/or the like. Additionally, or alternatively, the fragrance material 604 may comprise specifically scented ingredients. For example, the fragrance material 604 may comprise materials such as, but not limited to, cypress, mint, lemon, jasmine, lavender, eucalyptus, lemon, lavender, sandalwood, grapefruit, tea, and/or the like.

In some embodiments, the temperature sensitive material 606 and humidity sensitive material 608 may be mixed and/or blended with the fragrance material 604 in the core portion 610.

In some embodiments, the humidity sensitive material 608 transfers from a solid state to a liquid state when a relative humidity associated with the humidity sensitive material 608 is in a relative humidity range. For example, the humidity sensitive material 608 may comprise hydrophilic material. In such an example, the hydrophilic material is associated with a high affinity for water such that it transfers from a solid state to a liquid state when a humidity level of the environment (where the hydrophilic material is in) is within a specific humidity range (for example, a relative humidity range). In some embodiments, the specific humidity range may be determined based on relative humidity levels in the enclosed space of the mask component.

In some embodiments, the relative humidity levels in the enclosed space of the mask component may normally fluctuate within a given range. For example, referring now to FIG. 7, an example diagram showing example relative humidity levels within an example respiratory protective device is illustrated. In particular, the curve 701 shows relative humidity levels in an environment over time. In this environment, a user is wearing an example respiratory protective device, and the curve 703 shows relative humidity levels within the example respiratory protective device (for example, within the enclosed space) over time.

Figure 7:
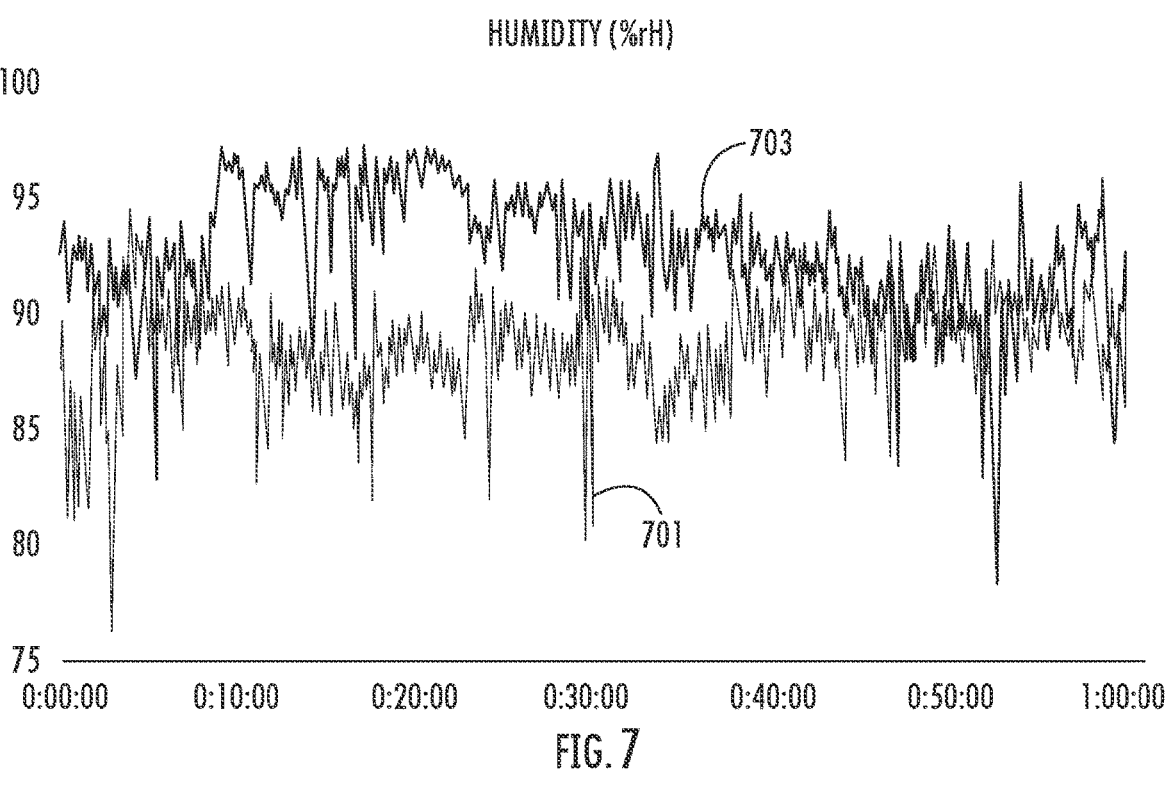
FIG. 7 illustrates an example diagram showing example humidity levels within an example respiratory protective device in accordance with some example embodiments described herein.

As illustrated in FIG. 7, relative humidity levels within the example respiratory protective device can be higher than relative humidity levels in the environment, and may fluctuate between 90% and 95% while the user is wearing the example respiratory protective device. As described above, the relative humidity range that triggers the phase change of the humidity sensitive material 608 may correspond to the relative humidity levels within the example respiratory protective device. In some embodiments, the relative humidity range that triggers the phase change of the humidity sensitive material 608 is above 90%.

For example, when the relative humidity of the environment where the humidity sensitive material 608 is in is below 90%, the humidity sensitive material 608 is in solid state. As the user starts wearing the example respiratory protective device, the relative humidity within the example respiratory protective device can reach above 90%, and the humidity sensitive material 608 starts changing from a solid state to a liquid state. When the user finishes wearing the example respiratory protective device and takes it off, the relative humidity within the example respiratory protective device can drop below 90%, and the humidity sensitive material 608 starts changing from the liquid state back to the solid state.

In some embodiments, the humidity sensitive material 608 can be selected based on this specific range. For example, the humidity sensitive material 608 comprises at least one of monosaccharide material, disaccharide material, or trisaccharide material. Additionally, or alternatively, the humidity sensitive material 608 may comprise other materials.

In some embodiments, the temperature sensitive material 606 may transfer from a solid state to a liquid state when the temperature of the temperature sensitive material 606 is within a specific temperature range or above a temperature. For example, the temperature sensitive material 606 may comprise phase change material (PCM). In such an example, the PCM may transfer from a solid state to a liquid state when a temperature of the PCM is within a specific temperature range, and may transfer from a liquid state back to a solid state when the temperature of the PCM drops below the specific temperature range. In some embodiments, the specific temperature range may be determined based on temperatures in the enclosed space of the mask component as described above.

In some embodiments, temperatures in the enclosed space of the mask component may normally fluctuate within a given range. For example, referring now to FIG. 8, an example diagram showing example temperature levels within an example respiratory protective device is illustrated. In particular, the curve 802 shows temperatures in an environment over time. In this environment, a user is wearing an example respiratory protective device, and the curve 804 shows temperatures within the example respiratory protective device (for example, within the enclosed space) over time.

Figure 8:
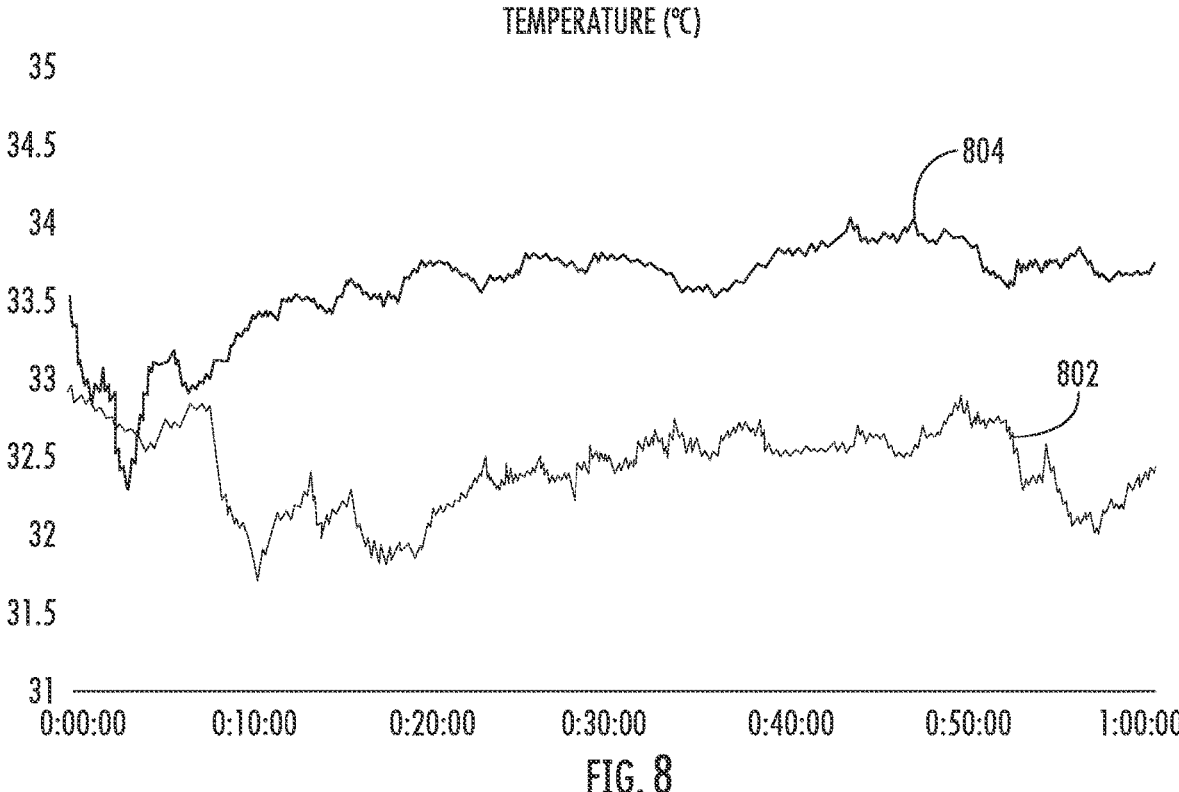
FIG. 8 illustrates an example diagram showing example temperature levels within an example respiratory protective device in accordance with some example embodiments described herein.

As illustrated in FIG. 8, temperatures within the example respiratory protective device can be higher than temperatures in the environment, and may fluctuate between 32 degrees Celsius and 35 degrees Celsius while the user is wearing the example respiratory protective device. As described above, the temperature range that triggers the phase change of the temperature sensitive material 606 may correspond to the temperatures within the example respiratory protective device. In some embodiments, the temperature range that triggers the phase change of the temperature sensitive material 606 is between 32 degrees Celsius and 35 degrees Celsius. For example, when the temperature of the temperature sensitive material 606 is below 32 degrees Celsius to 35 degrees Celsius range, the temperature sensitive material 606 is in solid state. As the user starts wearing the example respiratory protective device, the temperature within the example respiratory protective device can reach 32 degrees Celsius to 35 degrees Celsius, and the temperature sensitive material 606 starts changing from a solid state to a liquid state. When the user finishes wearing the example respiratory protective device and takes it off, the temperature within the example respiratory protective device can drop below 32 degrees Celsius to 35 degrees Celsius, and the temperature sensitive material 606 starts changing from the liquid state back to the solid state.

In some embodiments, the temperature sensitive material 606 can be selected based on this specific range. For example, the temperature sensitive material 606 may comprise at least one of paraffin material or polyethylene glycol (PEG) material. Additionally, or alternatively, the temperature sensitive material 606 may comprise other materials.

As described above, there are many technical challenges associated with the masks. For example, many masks fail to provide a long lasting release time of the scents and are plagued by difficulties in manufacturing. In contrast, various embodiments of the present disclosure overcome such technical challenges.

For example, the fragrance material 604 is mixed and blended with the temperature sensitive material 606 and humidity sensitive material 608 in the core portion 610. As described above, the humidity sensitive material 608 transfers from a solid state to a liquid state when the relative humidity is within a relative humidity range (that corresponds to the relative humidity levels within the respiratory protective device when it is worn by a user). Similarly, the temperature sensitive material 606 transfers from a solid state to a liquid state when the temperature is within a temperature range (that corresponds to the temperatures within the respiratory protective device when it is worn by the user).

As such, when a user wears an example respiratory protective device in accordance with example embodiments of the present disclosure, the temperature and the relative humidity level increase cause the temperature sensitive material 606 and humidity sensitive material 608 to transfer from solid states to liquid states. While in liquid states, the temperature sensitive material 606 and humidity sensitive material 608 can wet and/or dissolve the fragrance material 604, and can start and/or speed up the scent releasing by the fragrance material 604. For example, as shown in FIG. 6, molecules of the fragrance material 604 can be released through the shell portion 602 (for example, through diffusion through the shell portion 602 and/or through rupture of the shell portion 602).

When the example respiratory protective device in accordance with example embodiments of the present disclosure is not worn by a user, the temperature sensitive material 606 may be in a solid state as the temperature may be below the temperature range that triggers the temperature sensitive material 606 to transfer to a liquid state. Similarly, the humidity sensitive material 608 may also be in a solid state as the relative humidity level may be below the relative humidity range that triggers the humidity sensitive material 608 to transfer to a liquid state. While in the solid states, the temperature sensitive material 606 and humidity sensitive material 608 can limit and/or obstruct the fragrance material 604 from releasing scent through the shell portion 602, and therefore prolong the lifespan of the fragrance material 604.

By combining the design of the filtration component with respiration characters (such as specific temperature and humidity inside the respiratory protective device), various embodiments of the present disclosure can limit the scent releasing when the example respiratory protective device is not in user and speed up the scent releasing when the example respiratory protective device is worn by a user. As such, various embodiments of the present disclosure can achieve a long-lasting releasing time for the fragrance material 604 to release scent, which can be equivalent to the service lifetime of the filtration component (such as 30 days).

Figure 9:
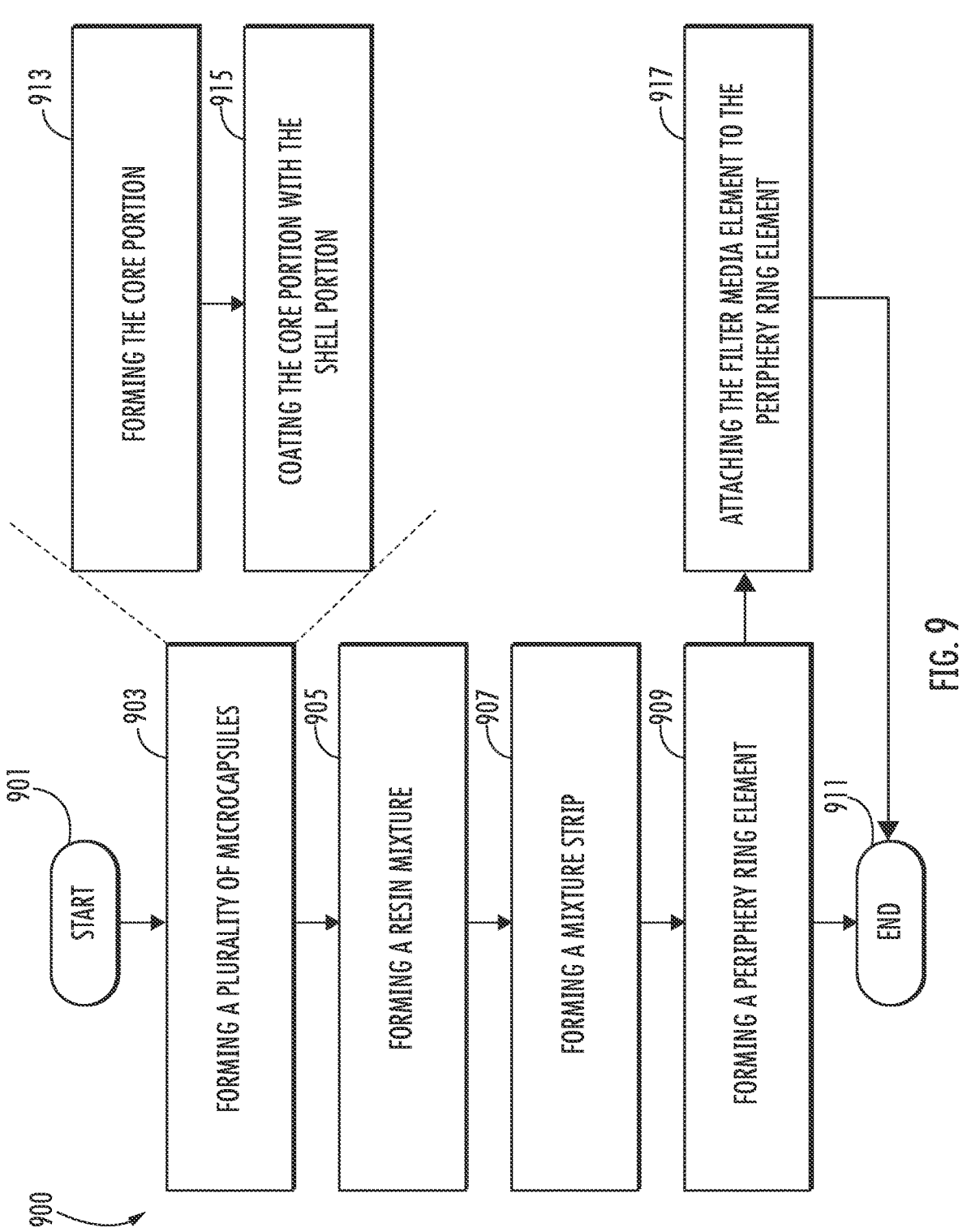
FIG. 9 illustrates an example method of manufacturing an example filtration component for a respiratory protective device in accordance with some example embodiments described herein.

Referring now to FIG. 9, an example method 900 is illustrated. In particular, the example method 900 illustrates example steps/operations of manufacturing an example filtration component for a respiratory protective device in accordance with some example embodiments described herein.

In FIG. 9, the example method 900 starts at step/operation 901. In some embodiments, subsequent to step/operation 901, the example method 900 proceeds to step/operation 901. At step/operation 903, the example method 900 comprises forming a plurality of microcapsules.

In some embodiments, the plurality of microcapsules can be manufactured through microencapsulation techniques. For example, each of the plurality of microcapsules comprises a shell portion and a core portion. The core portion is confined in the coating of the shell portion.

As such, to form the plurality of microcapsules at step/operation 903, the example method 900 may comprise forming the core portion at step/operation 913 and coating the core portion with the shell portion at step/operation 915.

In some embodiments, forming the core portion is based at least in part on mixing fragrance material, temperature sensitive material, and humidity sensitive material. As described above, the fragrance material may comprise materials such as, but not limited to, fragrance oil, essential oils, cypress, mint, lemon, jasmine, lavender, eucalyptus, lemon, lavender, sandalwood, grapefruit, tea, and/or the like. In some embodiments, the temperature sensitive material may be selected based on the temperature range that triggers the temperature sensitive material to transfer from a solid state to a liquid state corresponding to or overlapping with the temperature range within the respiratory protective device. In some embodiments, the temperature sensitive material comprises at least one of paraffin material or PEG material. In some embodiments, the humidity sensitive material may be selected based on the relative humidity range that triggers the humidity sensitive material to transfer from a solid state to a liquid state corresponding to or overlapping with the relative humidity range within the respiratory protective device. In some embodiments, the humidity sensitive material comprises at least one of monosaccharide material, disaccharide material, or trisaccharide material.

In some embodiments, the mixture of the fragrance material, the temperature sensitive material, and the humidity sensitive material are coated and/or enclosed by the shell portion. As described above, the shell portion comprises heat resistant material. For example, the shell portion comprises crosslinked polyurethane, polyamide, and/or functional resin.

Referring back to FIG. 9, subsequent to step/operation 903, the example method 900 proceeds to step/operation 905. At step/operation 905, the example method 900 comprises forming a resin mixture.

In some embodiments, forming the resin mixture is based at least in part on mixing and/or blending the plurality of microcapsules with other materials for the example filtration component. For example, the example method 900 may blend the plurality of microcapsules formed at step/operation 903 with thermoplastic elastomer material at step/operation 905. Additionally, or alternatively, the example method 900 may blend the plurality of microcapsules formed at step/operation 903 with other material(s).

Referring back to FIG. 9, subsequent to step/operation 905, the example method 900 proceeds to step/operation 907. At step/operation 907, the example method 900 comprises forming a mixture strip.

In some embodiments, the example method 900 forms the mixture strip based at least in part on injecting the resin mixture formed at step/operation 905 into an extruder. The extruder may complete an extrusion process based on the resin mixture formed at step/operation 905. For example, using a system of barrels and cylinders, the extruder heats up the resin mixture and propels it through a die to create a mixture strip.

Referring back to FIG. 9, subsequent to step/operation 907, the example method 900 proceeds to step/operation 909. At step/operation 909, the example method 900 comprises forming a periphery wall element of a filtration component.

In some embodiments, the example method 900 forms the periphery wall element of the filtration component based at least in part on molding the mixture strip in a mold. For example, the example method 900 may feed the mixture strip formed at step/operation 907 into a heated barrel and inject the molten mixture strip into a mold cavity. In some embodiments, the mold cavity may be in a shape that corresponds to the desired shape for the periphery wall element (for example, but not limited to, an annular cylinder shape or a three dimensional letter "D" shape as described above).

In some embodiments, subsequent to step/operation 909, the example method 900 proceeds to step/operation 911 and ends.

Optionally, in some embodiments, subsequent to step/operation 909, the example method 900 proceeds to step/operation 917. At step/operation 917, the example method 900 comprises attaching the filter media element to the periphery wall element.

As described above, the filter media element may comprise filter material such as, but not limited to, HEPA filter materials. In some embodiments, the example method 900 may attach the filter media element to an inner circumference surface of the periphery wall element that is formed at step/operation 909. For example, the filter media element may be attached to the inner circumference surface of the periphery wall element via mechanisms such as, but not limited to, adhesive materials like chemical glue.

In some embodiments, subsequent to step/operation 917, the example method 900 proceeds to step/operation 911 and ends It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A filtration component for a respiratory protective device, the filtration component comprising:
   a periphery wall element comprising a plurality of micro-capsules; and
   a filter media element secured to an inner circumference surface of the periphery wall element,
   wherein one or more of the plurality of microcapsules comprises a shell portion and a core portion,
   wherein the core portion is positioned within the shell portion, and
   wherein the core portion comprises a fragrance material.

2. The filtration component of claim 1, wherein the core portion comprises a temperature sensitive material.

3. The filtration component of claim 2, wherein the core portion comprises a humidity sensitive material.

4. The filtration component of claim 2, wherein the temperature sensitive material transfers from a solid state to a liquid state when a temperature of the temperature sensitive material is within a temperature range.

5. The filtration component of claim 4, wherein the temperature range is between 32 degrees Celsius and 35 degree Celsius.

6. The filtration component of claim 4, wherein the temperature sensitive material comprises at least one of a paraffin material or a polyethylene glycol (PEG) material.

7. The filtration component of claim 3, wherein the humidity sensitive material transfers from a solid state to a liquid state when the humidity sensitive material is in a relative humidity range.

8. The filtration component of claim 7, wherein the relative humidity range is more than 90%.

9. The filtration component of claim 7, wherein the humidity sensitive material comprises at least one of a monosaccharide material, a disaccharide material, or a tri-saccharide material.

10. The filtration component of claim 1, wherein the shell portion comprises a heat resistant material.

11. The filtration component of claim 10, wherein a melting temperature of the heat resistant material is above 180 degrees Celsius.

12. The filtration component of claim 10, wherein the heat resistant material comprises a crosslinked polyurethane, a polyamide, and/or a functional resin.

13. The filtration component of claim 1, wherein a thickness of the shell portion is above 50 micrometers.

14. The filtration component of claim 1, wherein the periphery wall element further comprises thermoplastic elastomer material.

15. A method for manufacturing a filtration component for a respiratory protective device, the method comprising:
   forming a plurality of microcapsules, wherein the each of the plurality of microcapsules comprises a shell portion and a core portion;
   forming the core portion based at least in part with a fragrance material;
   forming a resin mixture based at least in part on mixing the plurality of microcapsules with thermoplastic elastomer material;
   forming a mixture strip based at least in part on injecting the resin mixture into an extruder; and
   forming a periphery wall element of the filtration component based at least in part on molding the mixture strip in a mold.

16. The method of claim 15, wherein, when forming the plurality of microcapsules, the method forming comprising:
   forming the core portion based at least in part on mixing two or more of the fragrance material, a temperature sensitive material, and a humidity sensitive material; and
   coating the core portion with the shell portion, wherein the shell portion comprises heat resistant material.

17. The method of claim 16, wherein the temperature sensitive material comprises at least one of a paraffin material or a polyethylene glycol (PEG) material.

18. The method of claim 16, wherein the humidity sensitive material comprises at least one of a monosaccharide material, a disaccharide material, or a trisaccharide material.

19. The method of claim 15, wherein the shell portion comprises a crosslinked polyurethane, a polyamide, and/or a functional resin.

20. The method of claim 15, further comprising:
   attaching filter media element to an inner circumference surface of the periphery wall element.

* * * * *